(12) United States Patent
Morita et al.

(10) Patent No.: US 6,352,294 B1
(45) Date of Patent: Mar. 5, 2002

(54) WHEEL FOR A TRACK TRAVEL MOVING BODY, MOVING BODY PROVIDED WITH SAME, RAIL AND TRAVELLING EQUIPMENT USING RAIL

(75) Inventors: Nobutoshi Morita, Shizuoka-ken; Masami Mochizuki, Tokyo, both of (JP)

(73) Assignee: Tomoe Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/331,072

(22) PCT Filed: Dec. 17, 1997

(86) PCT No.: PCT/JP97/04653

§ 371 Date: Jun. 16, 1999

§ 102(e) Date: Jun. 16, 1999

(87) PCT Pub. No.: WO98/26944

PCT Pub. Date: Jun. 25, 1998

(30) Foreign Application Priority Data

Dec. 17, 1996 (JP) .............................. 8-337135
Mar. 28, 1997 (JP) .............................. 9-077630

(51) Int. Cl.⁷ .............................................. B60B 17/00
(52) U.S. Cl. ............................ 295/31.1; 295/8; 295/20
(58) Field of Search ............................ 295/8, 9.1, 31.1, 295/20, 34, 17; 427/180; 428/614; 105/26.05, 49; 148/583; 29/894.01

(56) References Cited

U.S. PATENT DOCUMENTS

| 116,752 A | * | 7/1871 | Prall .................... 105/26.05 |
| 367,069 A | * | 7/1887 | Shaw ........................ 105/49 |
| 873,477 A | * | 12/1907 | Woodworth ................ 295/20 |
| 1,479,373 A | * | 1/1924 | Cook ........................ 295/20 |
| 2,366,259 A | * | 1/1945 | Hersey et al. ............... 295/20 |
| 2,787,965 A | * | 4/1957 | Luvisi ........................ 295/8 |
| 2,819,681 A | * | 1/1958 | Luvisi ........................ 295/8 |
| 2,824,526 A | * | 2/1958 | Nohejl ........................ 295/8 |
| 2,877,716 A | * | 3/1959 | Ryznar ....................... 295/8 |
| 4,310,191 A | * | 1/1982 | Halldin .................... 295/31.1 |
| 4,431,227 A | * | 2/1984 | Howell ...................... 295/33 |
| 5,028,494 A | * | 7/1991 | Tsujimura et al. ......... 428/614 |
| 5,111,091 A | * | 5/1992 | Bahn ...................... 310/68 B |
| 5,121,607 A | * | 6/1992 | George, Jr. ................. 60/712 |
| 5,480,676 A | * | 1/1996 | Sonuparlak et al. ....... 427/180 |
| 5,587,640 A | * | 12/1996 | Ek et al. ................... 318/638 |
| 5,878,849 A | * | 3/1999 | Prunier, Jr. et al. ...... 188/251.4 |

* cited by examiner

Primary Examiner—S. Joseph Morano
Assistant Examiner—Lars A. Olson
(74) Attorney, Agent, or Firm—Fay, Sharpe, Fagan, Minnich & McKee, LLP

(57) ABSTRACT

A wheel comprises a main body, a tread making a contact with a top face of the rail head of a rail, and a flange. At least at a portion of the wheel tread which is in contact with the rail, there is provided a tread-forming component formed of a ceramic-particle-dispersion reinforced aluminum composite material, which has ceramic particles mixed in an aluminum alloy. The tread-forming component is formed in a ring shape, fitted into a tread-forming component receiving portion and fixed to the main body by a fixing member.

17 Claims, 8 Drawing Sheets

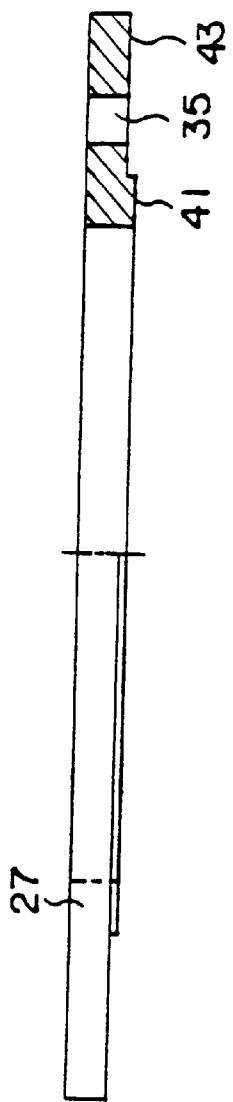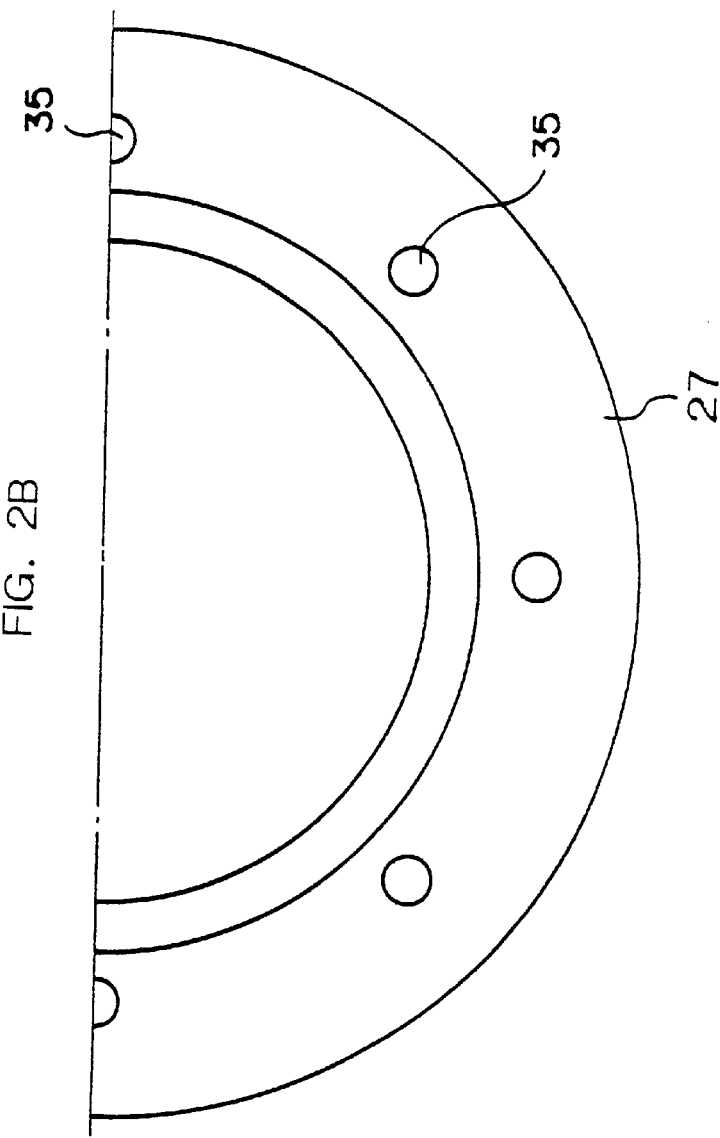
FIG. 2A
FIG. 2B

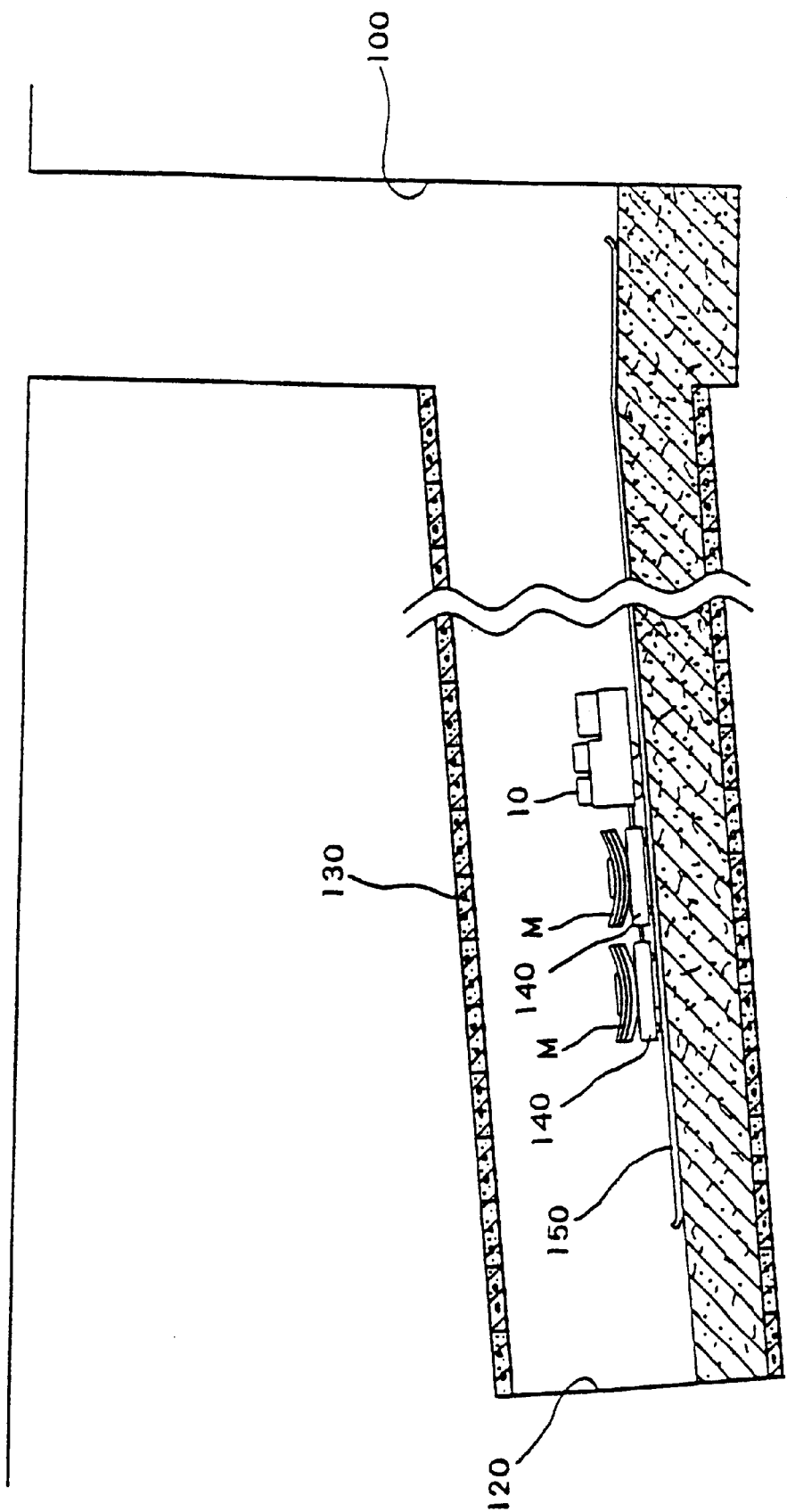

WHEEL FOR A TRACK TRAVEL MOVING BODY, MOVING BODY PROVIDED WITH SAME, RAIL AND TRAVELLING EQUIPMENT USING RAIL

FIELD OF THE INVENTION

The present invention relates to a moving body running on rails and a wheel thereof, and more specifically to a wheel for a moving body, which has a high coefficient of friction with steel rails and which also has high abrasion resistance.

Further, the present invention relates to a rail on which track-running moving body travels, and more particularly to a rail, which has a high coefficient of friction with a wheel and which also has high abrasion resistance.

BACKGROUND ART

As moving bodies that run on rails, there are vehicles that convey people and goods, working vehicles for changing the working position, and so on. Among the moving bodies, there are those that are equipped with driving wheels that receive driving power for self-propelled running on the rails. Generally, for the self-propelled moving bodies of this kind, to take an example, the locomotive has a tractive force, which is a product of the weight of the locomotive times the friction coefficient of the wheels.

Meanwhile, the rails and the moving bodies running on the rails, such as the wheels of the locomotive, are both generally made of steel. In this case, the friction coefficient between the wheel and the rail (hereafter sometimes referred to as "$\mu$") is 0.2 to less than 0.3. However, the friction coefficient to this level sometimes is not sufficient. For example, in a case of a moving body, such as a locomotive running on a steep grade, it is necessary to have a high tractive force to increase the gradability. However, there is a problem that the locomotive weight must increase over the necessity, since there is a limit at the size of friction coefficient between rail and wheel. On the other hand, for a moving body under a great load, because there is a large inertia, it takes time to accelerate, and a long braking distance is required in stopping.

For this, it is considered that the friction coefficient of the wheel's tread, which contacts a rail, increases for increasing the friction coefficient between rail and wheel. It is possible to attach urethane rubber having $\mu$ of about 0.4, for example, to the tread of the wheel. However, when wheels fitted with urethane are used, there is a problem that the urethane rubber heats up and its service life is short.

Another possible way of increasing the friction coefficient is to change the material of the wheel itself. To take an example, it is possible to form a wheel of aluminum or an aluminum alloy. In such a case, the value of $\mu$ can be increased. Regrettably, those materials are low in abrasion resistance and short in life.

DISCLOSURE OF THE INVENTION

An object of the present invention is to provide a wheel for a track-running moving body, which has high abrasion resistance and high durability and which realizes a high coefficient of friction with the rails, and also provide a moving body equipped with the wheels mentioned above.

A second object of the present invention is to provide a rail, which has high abrasion resistance and high durability and which realizes a coefficient of friction with the wheels, and also provide a running installation using the rails mentioned above.

To achieve the first object, according to a first embodiment of the present invention, there is provided a wheel for a moving body running on rails, comprising a main body and a tread-forming component for forming a wheel tread attached to the outer circumference of the main body and being in contact with a rail, wherein the tread-forming component having at least in a portion thereof in contact with contacting the rail a ceramic-particle-dispersion reinforced aluminum-base composite material, which has ceramic particles mixed in an aluminum alloy.

As the above-mentioned material, one containing 5 to 25 vol % of ceramic particles, or preferably, one containing 10 to 20 vol % of ceramic particles is used.

The above-mentioned wheel for a moving body may include a fixing member for fixing the tread-forming component to the main body. In this case, the main body may be formed to have around the outer circumference thereof a tread-forming component receiving portion for accepting the tread-forming component, wherein the tread-forming component is inserted in the receiving portion and fixed to the main body by using the fixing member.

The main body may have around a circumference thereof a plurality of tapped holes bored in the axial direction on the bottom-face side of the tread-forming component receiving portion. The tread-forming component may have through-holes bored at positions corresponding to the tapped holes, and the tread-forming component can be fixed to the main body by screwing bolts into the tapped holes.

Further, according to a second embodiment of the present invention, there is provided a moving body having a driving mechanism to drive at least one of the wheels to run on the rails, wherein the wheel driven by the driving mechanism includes a main body and a tread-forming component for forming a tread that contacts the rail by being attached to the outer circumference of the main body, and wherein the tread-forming component has at least in a portion thereof in contact with the rail a ceramic-particle-dispersion reinforced aluminum-base composite material, which has ceramic particles mixed in an aluminum alloy.

As the above-mentioned material, one containing 5 to 25 vol % of ceramic particles, or preferably, one containing 10 to 20 vol % is used.

An example of the moving body is an electric rolling stock, which has wheels and a motor for driving at least a pair of wheels among the wheels and which runs on the rails. To achieve the second object of the present invention, according to a third embodiment of the present invention, there is provided a rail for supporting the running moving body, wherein the rail comprises a rail foot, a web part and a rail head, and wherein at that portion of the head rail which contacts at least the tread of a wheel, there is provided a member formed by a ceramic-particle-dispersion reinforced aluminum-base composite material, which has ceramic particles mixed in an aluminum alloy.

As the above-mentioned material, one containing 5 to 25 vol % of ceramic particles is preferably used.

The above-mentioned member formed by a ceramic-particle-dispersion reinforced aluminum-base composite material may be prepared separately from the rail head, and secured to the top face of the rail head.

Further, according to a fourth embodiment of the present invention, there is provided a moving body running installation in which rails according to the third embodiment are laid.

Further, according to a fifth embodiment of the present invention, a moving-body stoppage area is provided where rails according to the third embodiment are laid.

According to the present invention, a tread-forming component made of a ceramic-particle-dispersion reinforced aluminum-base composite material is used at the tread of a wheel that is in contact with a rail, and this makes it possible to provides a wheel with superior abrasion resistance and a high coefficient of friction with the rail.

In the preferred embodiments of the present invention, in at least either the wheel or the rail and at their contact area, a ceramic-particle-dispersion reinforced aluminum-base composite material is used, and this material contains 5 to 25 vol % of ceramic particles. More particularly, one containing 10 to 20 vol % of ceramic particles is preferably used. Accordingly, the friction coefficient between the rail steel and the wheel (tread-forming component) can be increased to about 0.8 to 0.9 in an experiment and to 0.4 to 0.45 in an experiment using test specimens in the shape of an actual wheel. Therefore, it becomes possible to increase the tractive force of the moving body on those wheels or improve the braking performance without increasing the weight of the moving body. For example, if rails made of materials mentioned above are laid in heavy-grade territories or stoppage areas, a short-distance braking can be realized without making a moving body with an especially large weight.

According to the present invention, it is possible to realize a wheel for a moving body, which has high abrasion resistance and high durability and which is provided with a high coefficient of friction with the rail, and also realize a moving body using such wheels. Furthermore, it is possible to realize rails with high abrasion resistance and high durability, and added with a high coefficient of friction with conventional steel wheels.

BRIEF DESCRIPTION OF THE DRAWINGS

FIG. 2A is a side view, partly in cross section, of a wheel retainer according to the first embodiment of the present invention;

FIG. 2B is a partial front view of the wheel retainer in FIG. 2a;

FIG. 6 is an explanatory diagram showing an example of application of the battery locomotive;

DETAILED DESCRIPTION OF THE INVENTION

Figure 1A:
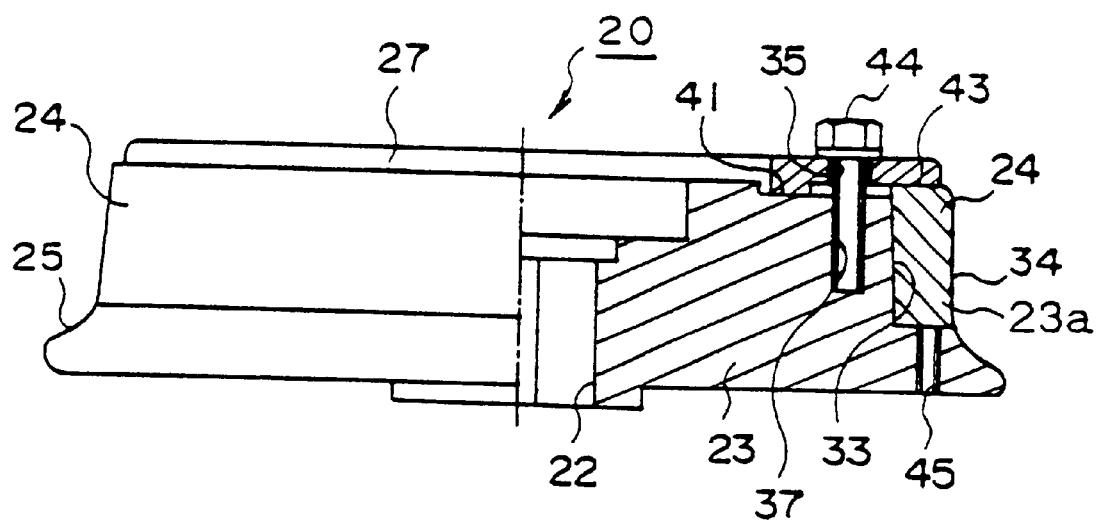
FIG. 1A is a side view, partly in cross section, of a wheel according to a first embodiment of the present invention.

Preferred embodiments of the present invention will be described with reference to the accompanying drawings.

Description will be made of a case where the present invention is applied to a battery type locomotive for transportation of materials and so on and to rails in tunnel construction sites or the like. Needless to say, the present invention is not limited to this way of use, but can be applied to various kinds of moving bodies moving on rails, such as various types of rolling stock like locomotives and electric cars, self-propelled working machines for excavation, cargo handling and so on, and self-propelled conveyors transporting materials and so on. Furthermore, the present invention can be applied to rails supporting the running vehicles mentioned above. Moreover, the present invention is not limited to moving bodies for construction and other works in construction sites, factories, and so on. For example, the present invention can be applied to passenger cars. More specifically, the present invention can be applied to rolling stock running in steep-grade territories, and high-speed railway vehicles, which require that the braking distance be shortened, and rails supporting those vehicles.

As shown in FIG. 6, a battery locomotive 10, to which the present invention is applied, is used for tunnel inside work to transport materials M and workers (not shown) and so on in an adit 130 between a shaft 100 and a working place 120 in a tunnel excavation work. In the adit 130, rails 150 have been laid and the locomotive 10 travels on the rails 150.

The rail 150 is a so-called T-type rail, and consists of a rail foot, a web portion that rises from about the center of the rail foot, and a rail head, which is on top of the web portion and in contact at its top face with the wheel. The rails are placed on a plurality of sleepers and fixed to the sleepers with bolts and rail spikes.

Description will now be made of a wheel according to the first embodiment, which is used in a battery locomotive. FIG. 1A is a side view, partly in cross section, of a wheel according to the first embodiment, and FIG. 1B is a partial front view of the wheel.

Figure 1B:
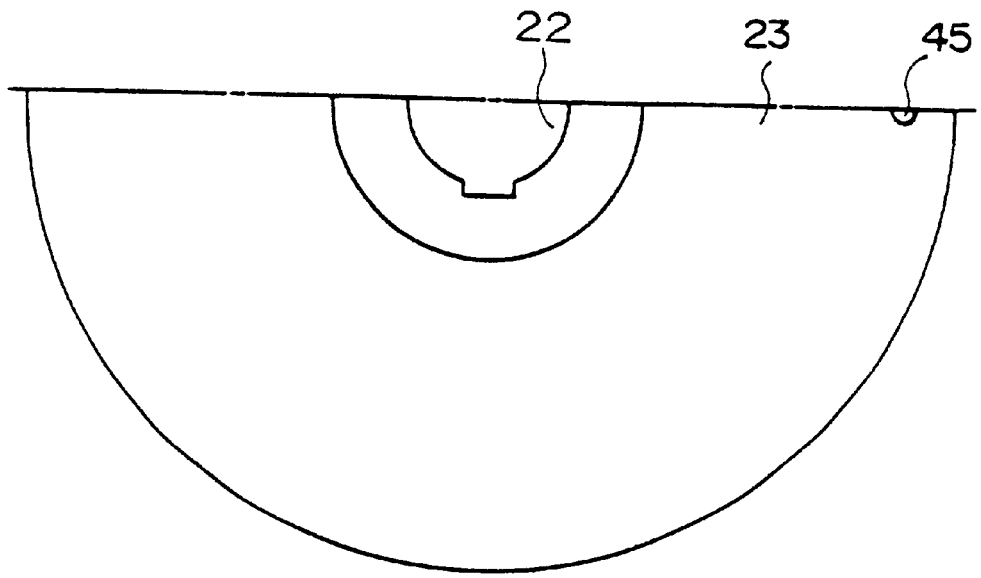
FIG. 1B is a partial front view of the wheel in FIG. 1A.

As shown in FIGS. 1A and 1B, in the first embodiment, a wheel 20 includes a main body 23, a tread-forming component 24, which is provided around the circumference of the main body 23 and in contact with the top face of the rail head, that is, the side which can be seen from outside, and a retainer member 27, which is provided on the front face of the wheel to hold the tread-forming component 24. The main body 23 has a through-hole 22 at the center thereof, in which a shaft (not shown) is mounted. According to the first embodiment, in the main body 23, the tire and the wheel center are formed in one body.

The tread-forming component 24 is formed by a ceramic-particle-dispersion reinforced aluminum composite material containing ceramic particles (hereafter referred to as an aluminum composite material) as described in great detail later. The tread-forming component 24 is formed in a ring (like a doughnut) surrounding the main body 23. As shown in FIG. 1A, the tread-forming component 24 has a contact face 34 to make a contact with the top face of the rail head of the rail. The grade of the contact face 34 is 1/20 according to JIS standard.

The main body 23 made of steel has the through-hole 22 for accepting and fixing the shaft. Around the outer circumference of the main body, there is formed a flange 25, which is smoothly continuous with the contact face 34 (in other words, with the tread of the wheel to make a contact with the rail) of the tread-forming component 24. The main body 23 has a notched space referred to as a tread-forming component receiving portion 23a, in which the tread-forming component 24 is press-fitted. The tread-forming component receiving portion 23a has an inclined face 33 for close contact with the inner circumferential surface of the tread-forming component 24. The inclined surface 33 has a grade of about 1/30 to facilitate press-fitting.

The retainer member 27 has a ring shape as shown in FIGS. 1A, 2A and 2B. This retainer member 27 is fixed to the main body 23 with bolts 44 as the bolts 44 are screwed into the main body 23, which will be described later. Thus, the tread-forming component 24 is fixed firmly to the main body 23. To be more specific, the retainer member 27 has a first retaining face 41, which contacts the front face of the main body 23 and is held to the main body 23 axially with bolts 44, and a second retaining face 43, which contacts the front face of the tread-forming component 24 and presses the tread-forming component 24 axially. In the retainer member 27, there are provided a plurality of through-holes 35 circumferentially spaced at fixed angle intervals.

Similarly, also in the main body, tapped holes 37 are provided at fixed-angle intervals so as to align with the through-holes 35 of the retainer member 27. Therefore, the main body 23 and the tread-forming component 24 are fixed together at the inclined faces 33 by screwing the bolts 44 into the tapped holes 37 through the through-holes 35.

Further, in the main body 23, a plurality of tapped holes 45 are arranged at fixed-angle intervals on the reverse side, namely, on the side where the shaft extends. Those tapped holes 45 are provided to push off the tread-forming component 24 with bolts, not shown, when the tread-forming component 24 is removed. Note that FIG. 1B shows only one tapped hole 45.

In this embodiment, the outside diameter of the wheel measured at the peripheral portion of the flange is about 470 mm, the outside diameter of the wheel measured at the outer circumferential wall of the tread-forming component 24 is about 420 mm, and the radial thickness of the tread-forming component 24 is about 55 mm. The diameter of the shaft is about 80 mm. The present invention is not limited by the size of the wheel. The present inventors, in applying the present invention, actually made wheels having outside diameters of about 300 mm to 660 mm and have confirmed the performance in terms of gradability, braking distance, and so on.

Next, description will be made of the construction and the manufacture of the tread-forming component 24 according to this embodiment. In this embodiment, the tread-forming component 24 is formed by an aluminum composite material containing ceramic particles. DURANCAN (registered trademark) available from Alcan Aluminum, Ltd. is one such aluminum composite material. DURALCAN is available with two kinds of materials at present. One is a material formed by mixing fine particles (in micron units, for example) of $Al_2O_3$(alumina) in an aluminum alloy of Al—Mg—Si system (alloy No.6061) as the matrix, and the other is a material formed by mixing fine particles of SiC (in micron units for example) in an aluminum alloy of Al—Cu system (alloy No.1024) as the matrix. Those materials are put into the well-known T-6 heat treatment before they are used. In the present invention, either of the two may be used, but considering corrosion resistance, brittle fracture, and so on, a material using the aluminum alloy (6061) as the matrix should preferably be used.

More specifically, materials made by mixing different contents of $Al_2O_3$ in the above-mentioned aluminum alloy (6061), such as "W6A10A" with 10 vol %, "W6A15A" with 15 vol % and "W6A20A" with 20 vol % of alumina, are preferably used. Those materials can be available from ALCAN mentioned above.

The aluminum alloy (6061) has a large coefficient of friction, tensile strength of 310 MPa and 17% elongation. However, the aluminum alloy (6061) has a problem in abrasion resistance. In contrast, the aluminum composite materials have excellent abrasion resistance. For example, W6A10A has an excellent Volume Loss about 1/300 times and a commendatory Wear Rate about 1/50 times as high as those of the aluminum alloy (6061). As the content of alumina particles becomes higher, the abrasion resistance becomes higher but the elongation becomes shorter. For example, W6A10A, having an elongation of about 10%, is easy to work and less liable to crack. On the other hand, W6A15A and W6A20A have an elongation of about 6% and about 4%, respectively, which are worse than with W6A10A.

Incidentally, an aluminum composite material with alumina content of 5 vol % has better abrasion resistance than aluminum alloy (6061) as the matrix, but this level of abrasion resistance is not sufficient for some applications. On the other hand, an aluminum composite material with alumina content of 25 vol % has excellent abrasion resistance, but is inferior in elongation to the aluminum alloy (6061) as the matrix. Therefore, according to research by the present inventors, it is advisable to use an aluminum composite material with ceramic particles of 5 to 25 vol %. In consideration of, above all, achieving the strength and workability of the tread-forming component equal to the strength and workability of steel wheels and rails, among the composite materials added with alumina for example, a material added with 10 vol % of alumina is most preferable, followed by materials with alumina contents of 15 vol % and 20 vol %. Meanwhile, aluminum composite materials containing ceramic particles are put into T-6 heat treatment.

The friction coefficient between steel and an aluminum composite material containing 10 vol % of ceramic particles was about 0.8 to 0.9 in an experiment with test samples. The friction coefficient in an experiment using samples in an actual wheel shape was 0.4 to 0.45, which is far larger than in the prior art.

The above-mentioned aluminum composite materials are materials with high strength-to-weight ratio and therefore have high strength. However, the casting-molded products of the aluminum composite materials have lower elongation performance than in their matrix. Therefore, when these materials are used as the tread-forming component of the wheel, they are liable to fracture by an impact when passing a joint of rails. Therefore, in the first embodiment, in the manufacture of a tread-forming component 24, an extruded product having a specified cross-sectional contour is formed like a ring (like a doughnut) and two end faces are welded together by flash butt welding or a tread-forming component 24 is formed as a ring by forging, and the forged ring is heat-treated and undergoes machining.

The tread-forming component 24 in a ring shape obtained as described is press-fitted along the inclined face 33 and fitted in the tread-forming component receiving portion 23a of the main body 23. Then, by fastening the retainer member 27 and the main body 23 together with bolts, the tread-forming component 24 and the main body 23 are fixed firmly. The tread-forming component 24 is detached from the main body 23 by first removing the retainer member 27 and screwing bolts (not shown) into the tapped holes 45 of the main body 23 to thereby push off the tread-forming component 24.

By the arrangement mentioned above, an expensive aluminum composite material is used only for the tread of the wheel, for which reason the cost of the wheel can be prevented from increasing so much. In addition, the ring-shaped tread-forming component 24 can be replaced, so that the worn wheel can be regenerated easily.

Figure 3:
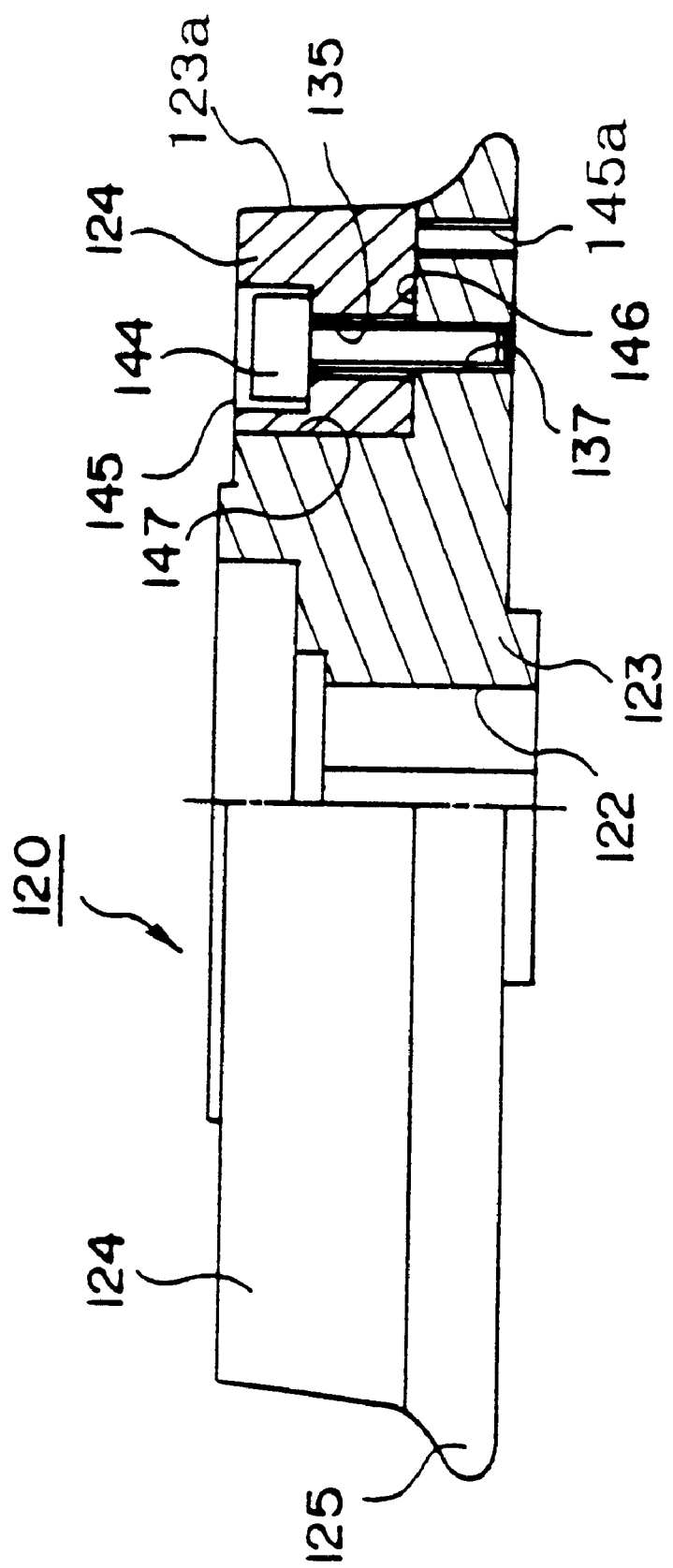
FIG. 3 is a side view, partly in cross section, of a wheel according to a second embodiment of the present invention.

Description will then be made of a wheel according to the second embodiment of the present invention. FIG. 3 is a side view, partly in cross section, of the wheel according to the second embodiment.

Differences of a wheel 120 in the second embodiment shown in FIG. 3 from the wheel in the first embodiment lie in the construction of the tread-forming component 124 and the method of its mounting to the main body 123. More specifically, in the wheel 120, the tread-forming component 124 is directly fixed to the main body 123 by fastening the tread-forming component 124 with bolts 144.

Like in the first embodiment, the tread-forming component 124 is formed by an aluminum composite material in a ring shape surrounding the circumferential surface of the tread-forming component receiving portion, which extends around the outer circumference of the main body. Meanwhile, the tread-forming component 124 has a greater radial thickness than in the first embodiment.

The main body 123 made of steel has a through-hole 122 for accepting and fixing a shaft. Around the outer circumferential portion of the main body 123, there is provided a flange 125, which is smoothly continuous with the outer circumference of the tread-forming component 124 (in other words, with the tread of the wheel to make a contact with the rail). Furthermore, the main body 123 has a bearing surface 146 and a side surface 147, which constitute the tread-forming component receiving portion 123a to accept the tread-forming component 124 when the tread-forming component 124 is mounted.

In the tread-forming component 124, there are provided a plurality of through-holes 135 circumferentially spaced at fixed angle intervals, while in the main body 123, too, tapped holes 137 are provided spaced at predetermined angles so as to align with the through-holes 135 of the tread-forming component 124. The tread-forming component 124 and the main body 123, being made of different metals, have different linear expansion coefficients by heat. In other words, the tread-forming component 124 of an aluminum-based material has a higher linear expansion coefficient than the main body 123 of steel. Therefore, the main body 123 and the tread-forming component 124 are fixed firmly together by screwing bolts 144 into the tapped holes 137 through the through-holes 135 to prevent the tread-forming component 124 from moving in the circumferential direction. Cavities 145 are formed almost concentrically with the through-holes 135 to prevent the bolts 144 from protruding externally of the wheel. For those bolts, hexagon socket head bolts, for example, can be used.

In the second embodiment, the radial thickness of the tread-forming component 124 is a little more than 70 mm. Other sizes are the same as in the first embodiment.

The tread-forming component 124 according to the second embodiment can be made substantially in the same manner as in the first embodiment. That is, a material of a specified cross sectional contour is formed into a ring shape by forging, and the forged ring is heat-treated and undergoes machining. Subsequently, tapped holes and cavities are formed by drilling the ring-shaped product.

A tread-forming component 124 thus produced is fitted into the tread-forming component receiving portion 123a of the main body 123. The tread-forming component 124 is fixed firmly to the main body 123 by fastening with bolts 144.

According to the second embodiment, the tread-forming component 124 can be fixed to the main body 123 without using a retainer member, so that the number of required parts can be reduced.

In the second embodiment, like in the first embodiment, tapped holes 145a are provided to make it easy to remove the tread-forming component 124. However, in the second embodiment, the tread-forming component 124 is not press-fitted, such tapped holes may be omitted.

Figure 9A:
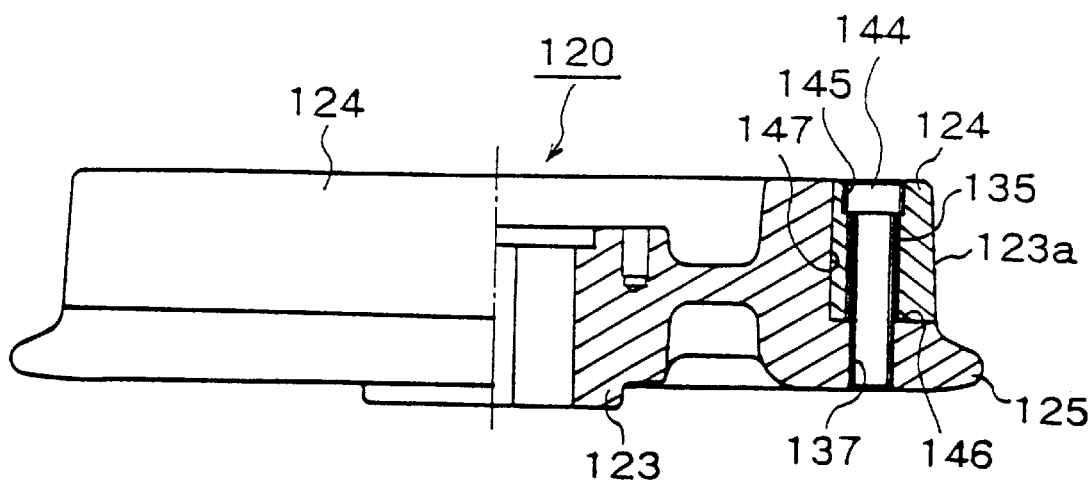
FIG. 9A is a side view, partly in cross section, of a modification of the wheel according to the second embodiment of the present invention.
Figure 9B:
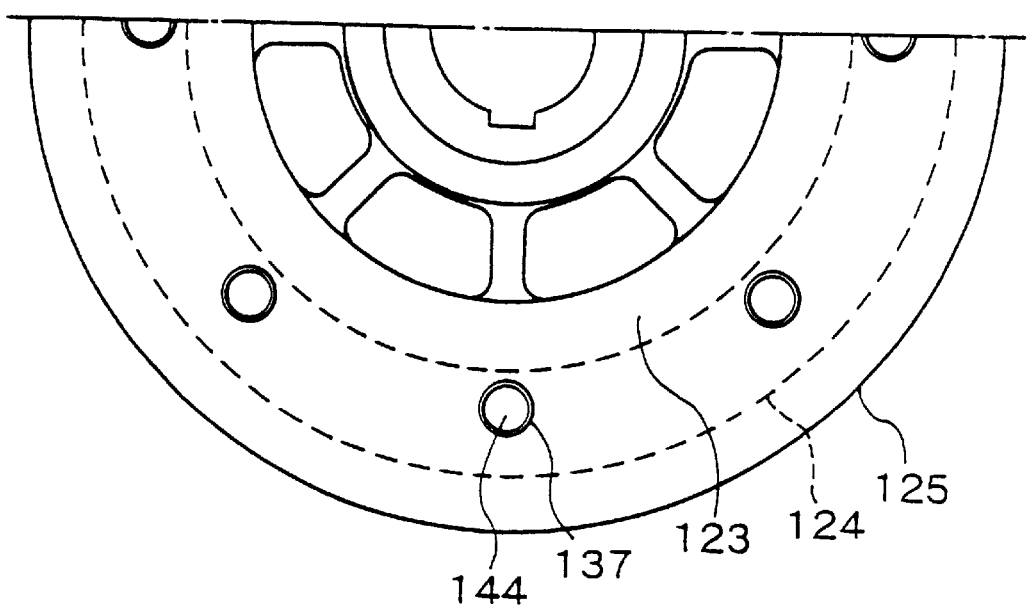
FIG. 9B is a partial front view of the wheel in FIG. 9A.

FIGS. 9A and 9B show a modification of the wheel according to the second embodiment. The wheel shown in FIGS. 9A and 9B is basically identical in construction with the second embodiment excepting that no holes (145a in FIG. 3) are provided in the flange 125 and that the wheel center portion of the main body is formed like spokes. The radial thickness of the tread-forming component 124 is made thinner so that the amount of an expensive material used for the tread-forming component can be reduced and that the cost of the wheel can be decreased.

Figure 4:
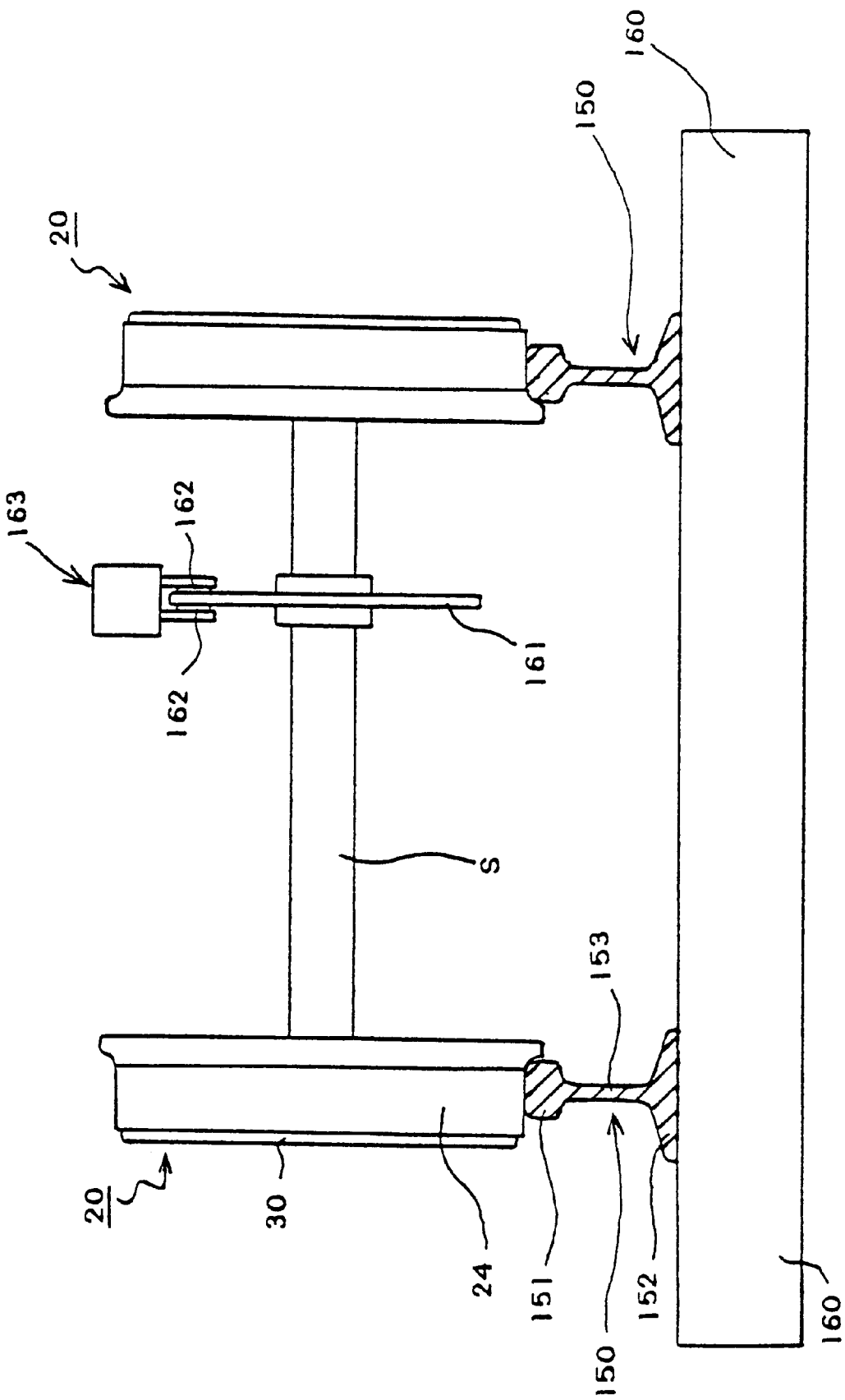
FIG. 4 is a front view showing a wheel portion of a battery locomotive using wheels according to this embodiment.

FIG. 4 is a schematic diagram, partly in cross section, showing the wheels of a battery locomotive that have been described above. As shown in FIG. 4, the tread-forming component 24 of a wheel 20 is in contact with the top face of a head 151 of a rail 150. The rail 151 consists of a rail foot 152 attached to a sleeper 160, a web portion 153 rising about the center of the rail foot, and a rail head 151 located on top of the web portion.

The wheel having the tread-forming component 24 made of an aluminum composite material has a high friction coefficient $\mu$ and a high abrasion resistance in the tread-forming component 24. Those characteristics offer a first merit of a reduced braking distance, which greatly contributes to safety. For example, a battery locomotive for construction work uses electric braking such as regenerative braking, but does not use a brake shoe in wide use to hold the wheel to stop. In this case, the stopping distance is determined by the $\mu$ of the wheel. Therefore, when a battery locomotive is fitted with wheels each equipped with the tread-forming component 24 of aluminum composite material, the great value of $\mu$ of the wheels makes the stopping distance shorter by 40% to 50% than with the steel wheels. This results in a great contribution to safety.

Further, a disc brake 163 is installed, which includes a disc 161 secured to the shaft S, brake pads 162, 162 that hold the disc 161 from both sides, and an operating mechanism (not shown) to drive the brake pads 162, 162. The disc brake 163 is used as the parking brake during stoppage. For the operating mechanism, a hydraulic or pneumatic type, for example, is used. In this case, too, the wheel according to the present invention has a large coefficient of friction $\mu$ with the rail 150, it is less likely to skid while stationary in the middle of a slope, and therefore features high safety.

Figure 5:
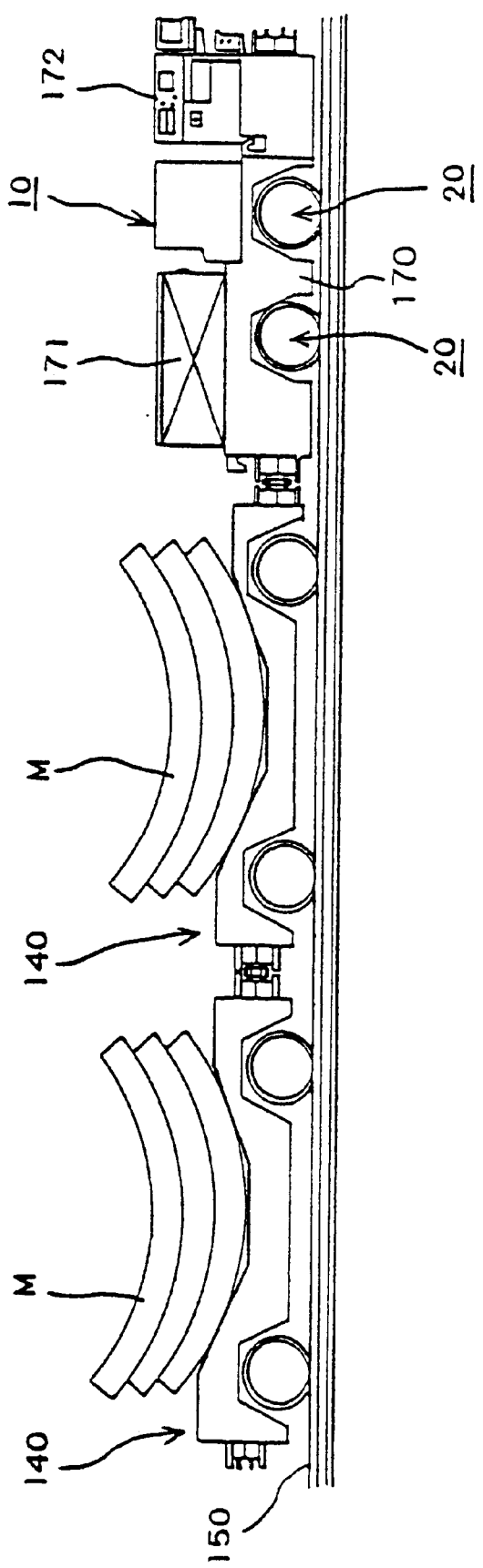
FIG. 5 is a side view showing an example of application of the battery locomotive in FIG. 4.

Referring to FIG. 5, description will be made of an application of an electric locomotive using wheels according to the second embodiment. FIG. 5 shows a battery locomotive 10 using wheels shown in FIG. 4 and bogies 140 coupled to the locomotive 10.

As shown in FIG. 5, the locomotive 10 includes two pairs of wheels 20, 20, each pair having a driving wheel and a driven wheel, a body 170 supported by those wheels, two motors (not shown) for driving the respective driving wheels, a battery 171 for rotating the two motors, and an operation panel 172 to control the two motors to operate the locomotive. The locomotive 10 is equipped with driving devices, such as a power transmission and a control unit in addition to the motors. The locomotive 10 is coupled to bogies 40, 40 loaded with materials M.

In the battery locomotive 10, the tractive force corresponds a product of the weight of the locomotive times the value of $\mu$ as described above. Battery locomotives using conventional wheels with $\mu$ of 0.2 to less than 0.3 were only able to climb grades of 40 to 50/1000. In contrast, in the second embodiment, the $\mu$ can be actually increased to 0.4 to 0.45. Therefore, it becomes possible to climb a grade of about 100/1000, which is about two times (in other words, 0.4/0.2 times) the conventionally climbable grades.

In other words, when climbing grades is about 50/1000 or more, locomotives and tracks equipped with the so-called Abt system have been used. According to the second embodiment, it is possible to realize a locomotive capable of climbing steep grades of about 100/1000 without using the expensive Abt system. Needless to say, according to the present invention, it becomes possible to increase the gradability for not only the locomotives but also other moving bodies, such as self-propelled bogies and self-propelled working machines.

Furthermore, according to the above-mentioned embodiment, a third merit is that the increased value of $\mu$ makes it possible to increase the tractive force of the moving body without increasing its weight. Therefore, a small moving body can pull a large load, which has been impossible, if the output is increased. For example, a locomotive can pull bogies carrying heavier loads.

The present invention is not limited to the foregoing embodiments. Needless to say, many variations of the present invention may be made without departing from the scope of the following claims and are included in the scope of the present invention.

In the wheel according to the present invention, the tread-forming component needs to be formed at least at its contact face with the rail. The shape of the tread-forming component is not limited. The outside diameters of the wheel and the shaft and the thickness of the tread-forming component are not limited to those of the above-mentioned embodiments.

Obviously, the application of the present invention is not limited to the battery locomotive. It is obvious that the present invention can be applied not only to a locomotive but also to a self-propelled bogie for hauling people and materials and a self-propelled working vehicle.

The wheel fitted with the aluminum composite material has a large coefficient of friction $\mu$ between the tread of an aluminum composite material and the rail. The braking effect of electric braking is determined by a coefficient of friction between the tread and the rail. Therefore, as the value of $\mu$ becomes large, the braking distance becomes short and safety is increased. For example, servomotor-driven vehicles, such as a battery locomotive and a self-propelled bogie, which are driven by a servomotor, are stopped by regenerative braking by a servomotor. Therefore, the braking distance is shorter according as the value of $\mu$ becomes larger.

Figure 7A:
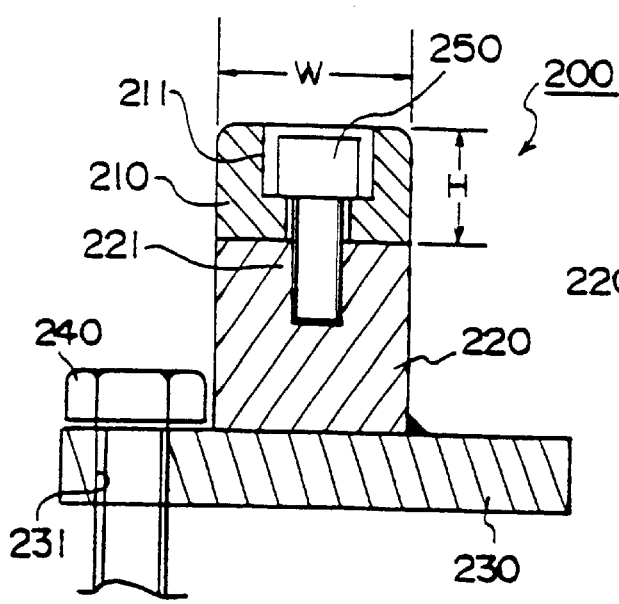
FIG. 7A is a sectional view of a rail according to a third embodiment of the present invention.

A third embodiment of the present invention will be described in the following. FIG. 7A is a cross-sectional view of a rail according to a third embodiment, and FIG. 7B is a side view.

Figure 7B:
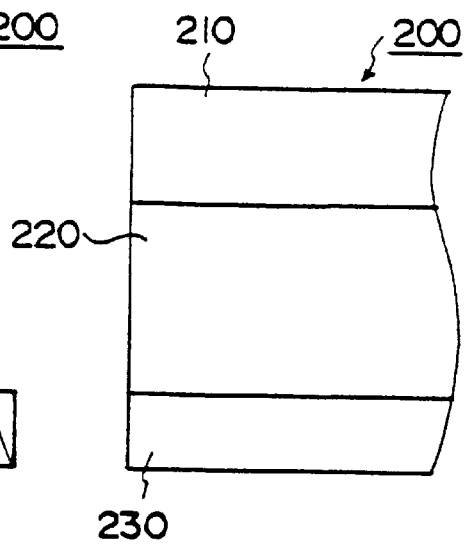
FIG. 7B is a partial side view of the rail in FIG. 7A.

As shown in FIGS. 7A and 7B, a rail 200 according to the third embodiment consists of a rail head 210, a web portion 220 and a rail foot 230. The rail head 210 is formed of a material to be described later, and the web portion 220 and the rail foot 230 are made of steel, for example, and formed as one body. In the rail foot 230, there are formed through-holes 231 at specified intervals (about 1 m, for example).

The rail is fixed to sleepers (not shown) by bolts 240 and rail spikes. Also in the web portion, tapped holes 221 are formed at specified intervals (500 mm to 600 mm, for example).

The rail head 210 of this rail is has a height H of 30 mm to 50 mm and a width W of 50 mm to 60 mm. The web portion 220 has a height of about 50 mm and a width almost the same as with the rail head 210. The rail foot 230 has a height of about 20 mm.

In the third embodiment, like in the wheel mentioned above, the rail head 210 is formed of an aluminum composite material containing 5 to 25 vol %, or preferably, 10 to 20 vol % of ceramic particles. Most preferably is an aluminum composite material containing 10 vol % of ceramic particles. Therefore, the description of the material itself is not repeated. DURALCAN (registered trademark) available from ALCAN is one such material. As has been described, the DURALCAN has an excellent Volume Loss about 1/300 times and a superb Wear Rate about 1/50 times as high as those of the aluminum composite material (6061) as the matrix. Furthermore, in aluminum composite materials with ceramic content, for example, $Al_2O_3$, of 5 to 25 vol %, the coefficient of friction with the steel wheel was about 0.8 to 0.9 in an experiment with samples, and about 0.4 to 0.45 in an experiment with actual rail and wheel. The friction coefficient of the rail according to the present invention with the wheel is far greater than the friction coefficient with the conventional rail.

In the third embodiment, a material is put to an extrusion process to produce a prolonged square rod with a predetermined length and a cross sectional contour shown in FIG. 7A, and after heat-treated, the square rod undergoes machining to get holes bored. By having tapped holes 211 bored at specified intervals, a rail head 210 is completed. The rail head 210 is placed on a web portion 220 that have tapped holes 221 already bored at positions corresponding to the tapped holes 211, and a rail 200 is completed by fastening the rail head and the web together by bolts 250.

The rail according to the present invention can be used in all areas as the rail to support running moving bodies. However, the rail according to the third embodiment requires an expensive material and therefore may be laid preferentially in areas that require this rail, such as steeply inclined areas and stoppage areas for example. In the sections where rails according to the third embodiment are laid, a short braking distance can be realized even when ordinary steel wheels are used. Needless to say, in the areas where rails according to the third embodiment are laid, it is possible to run moving bodies on wheels according to the above-mentioned embodiments.

In the running installation using conventional steel rails and moving bodies with steel wheels, along the inclined tracks with a grade of about 50/1000 or greater, moving bodies and tracks equipped with the so-called Abt system are used. For example, in the case of a locomotive, the Abt system is used in which a rack rail is laid between two rails and the pinion gear on the locomotive engages with the rack rail to let the locomotive climb the grade. In contrast, in the running installation according to the third embodiment, by laying rails 200 along the inclined tracks with grades of up to about 100/1000 for example, the moving body can run without using the expensive Abt system.

Further, rails 200 according to the third embodiment may be laid only in a special area, such as an area for a specified length including a position where a moving body, such as a locomotive, is placed in a halt condition. By this arrangement, the braking distance of moving bodies can be shortened by 40% to 50%, which results in improved safety.

As has been described, by laying rails with the rail head of aluminum composite material in the heavy-grade track and/or in the vicinity of the vehicle stoppage area, and laying conventional steel rails in other territories, a running system with high safety can be established without incurring not so much cost increase.

Figure 8A:
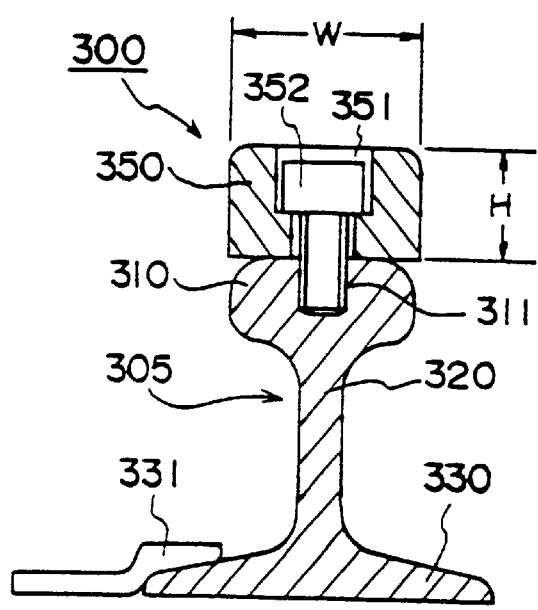
FIG. 8A is a sectional view of a rail according to a fourth embodiment of the present invention.
Figure 8B:
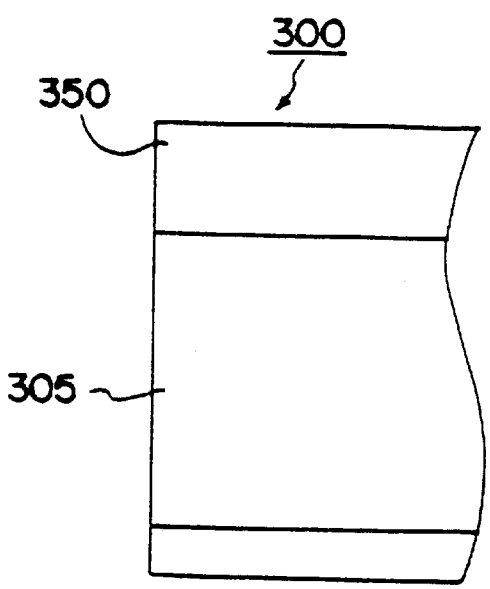
FIG. 8B is a partial side view of the rail in FIG. 8A.

Description will then be made of a fourth embodiment of the present invention. FIG. 8A is a cross-sectional view of a rail according to the fourth embodiment of present invention. FIG. 8B is a side view of the rail in FIG. 8A.

As shown in these figures, a rail 300 according to the fourth embodiment consists of a rail head 310, a web portion 320, rail foot 330 and a rail-head-forming component 350. The portion from the rail head 310 to the rail foot 330 of the rail according to the fourth embodiment is the same as the steel-made 22-kg rail (weight per meter about 22 kg). The rail-head-forming component 350 is mounted on a rail main body 305, which is the 22-kg rail. The rail-head-forming component 350 is made of a material to be described later.

The rail foot 330 is fixed to sleepers (not shown) by a retainer members 331 and rail spikes (not shown). The rail head 310 has formed therein tapped holes 311 at specified intervals (500 mm to 600 mm, for example).

The rail-head-forming component 350 of the rail 300 according to the fourth embodiment has a height H of 30 mm to 50 mm and a width W of 50 mm to 60 mm. Preferably, the width W is substantially equal to the width of the 22-kg rail (at its rail head 310).

The rail-head-forming component 350, like the rail head 210 in the third embodiment, is formed of an aluminum composite material (for example, DURALCAN—registered trademark) containing 5 to 25 vol % or preferably 10 to 20 vol % of ceramic particles. The ceramic particle content of 10 vol % is most preferable.

In the fourth embodiment, a material is put into an extrusion process to produce a prolonged square rod with a predetermined length and a cross sectional contour shown in FIG. 8A, and after heat-treated, the square rod undergoes machining to get holes bored. By having through-holes 351 bored at specified intervals, a rail-head-forming component 350 is completed. The rail-head-forming component 350 is placed on a rail main body 305 that have tapped holes 311 already bored at positions corresponding to the through-holes 351, and the rail-head-forming component 350 is fixed to a rail 300 by screwing bolts 352 securely into the tapped holes 311. The rail 300 is thus completed. The height of the rail fitted with the rail-head-forming component 350 is higher than the rail main body 305. To this end, a rail fitted with a tapered member is placed between a track where only the rail main body 305 has been laid and a track where the rail 300 added with the rail-head-forming component has been laid (an inclined track for example) in order that the vehicles can run smoothly.

Like in the third embodiment, it is preferable to connect rails 300 according to the fourth embodiment in series for a specified length and lay this series of rails 300 at a heavy-grade track heavier than a specified grade or in the vicinity of the area where a locomotive comes to a halt, and use ordinary 22-kg rails in other territories. By constructing running installation in this manner, a running installation assured of high safety can be established without incurring not so much cost increase.

The present invention is not limited to the foregoing embodiments. Needless to say, many variations of the present invention may be made without departing from the scope of the following claims and are included in the scope of the present invention.

For example, in the third embodiment, the rail head 210 is formed of an aluminum composite material, but the size and shape are not limited to those given in its description, and it is only required to form the rail-head-forming component of aluminum composite material so as to include a portion which makes a contact with the tread of the wheel.

In the fourth embodiment, the rail-head-forming component 350 is mounted on the 22-kg rail, but this does not show the limitation, and the rail-head-forming component 350 may be mounted on a 15-kg rail, 30-kg rail, 37-kg rail and so on. It ought to be noted that in such a case, the width of the rail-head-forming component should preferably be substantially equal to the width of the rail.

Furthermore, moving bodies running on the running installation including rails according to the above-mentioned embodiment are not limited to locomotives, but may be self-propelled bogies hauling people and materials, self-propelled working machines, and so on. The moving bodies are not limited to electric cars driven by motors, but may be vehicles driven by diesel engines.

In this specification, the function of one member may be realized by two or more physical members or the functions of two or more members may be realized by one member. For example, the tread-forming component and the main body mentioned above are a combined body of two discrete members, but may be provided in one body.

What is claimed is:

1. A wheel for a moving body running on rails, comprising a main body and a tread-forming component for forming a wheel tread removably attached to an outer circumference of said main body and being in contact with a rail, wherein said tread-forming component is comprised of a preformed ring with a ceramic-particle dispersion reinforced aluminum-base composite material, which has ceramic particles mixed in an aluminum alloy.

2. A wheel for a moving body according to claim 1, wherein said material contains 5 to 25 vol % of ceramic particles.

3. A wheel for a moving body according to claim 1, further comprising a fixing member for fixing said tread-forming component to said main body, wherein:

said main body is formed to have around the outer circumference thereof a tread-forming component receiving portion for accepting said tread-forming component, and said tread-forming component is inserted in said receiving portion and fixed to said main body by said fixing member.

4. A wheel for a moving body according to claim 1, wherein:

said main body has around the circumference thereof a plurality of tapped holes bored in the axial direction on the bottom-face side of said tread-forming component receiving portion, said tread-forming component has through-holes bored at positions corresponding to said tapped holes, and said tread-forming component is fixed to said main body by screwing bolts into said tapped holes.

5. A wheel for a moving body according to claim 1, wherein said ceramic-particle-dispersion reinforced aluminum-base composite material to form said tread-forming component is made by dispersing ceramic particles in a matrix of a 6061 aluminum alloy, and has been forged and heat-treated.

6. A moving body having wheels and a driving mechanism to drive at least one of said wheels to run on a rail by said wheels, wherein:

among said wheels, said wheel driven by said driving mechanism includes a main body and a tread-forming component for forming a tread in contact with said rail by being removably attached to the outer circumference of said main body, and said tread-forming component is comprised of a preformed ring with a ceramic-particle-dispersion reinforced aluminum-base composite material, which has ceramic particles mixed in an aluminum alloy.

7. A moving body according to claim 6, wherein said material contains 5 to 25 vol % of ceramic particles.

8. A moving body according to claim 6, wherein said driving mechanism includes a servomotor capable of regenerative braking.

9. A wheel for a moving body according to claim 6, wherein said ceramic-particle-dispersion reinforced aluminum-base composite material to form said tread-forming component is made by dispersing ceramic particles in a matrix of a 6061 aluminum alloy, and has been forged and heat-treated.

10. An electric rolling stock having wheels and a motor for driving at least a pair of wheels among said wheels to run on said rails by said wheels, wherein:

among said wheels, said wheel driven by said driving mechanism includes a main body and a tread-forming component for forming a tread in contact with said rail by being removably attached to the outer circumference of said main body, and said tread-forming component is comprised of a preformed ring with a ceramic-particle-dispersion reinforced aluminum-base composite material having ceramic particles mixed in an aluminum alloy.

11. An electric rolling stock according to claim 10, wherein said motor is a servomotor.

12. A rail for supporting a moving body, comprising a rail foot, a web portion and a rail head, wherein said rail head is a V rod-shaped member made from a ceramic-particle-dispersion reinforced aluminum-base composite material, which has ceramic particles mixed in an aluminum alloy, and said rail head is provided on an upper portion of said web portion.

13. A rail according to claim 12 wherein said material contains 5 to 25 vol % of ceramic particles.

14. A moving-body running installation in which rails according to claim 12 are laid at an inclined area.

15. A moving-body running installation in which a moving-body stoppage area is provided with rails according to claim 12.

16. A rail for supporting a moving body, comprising: a rail foot, a web portion, a rail head and a V rod-shaped member made from a ceramic-particle-dispersion reinforced aluminum-base composite material; and said member is provided separately from said rail head, and secured to a top face of said rail head.

17. A tread-forming component attached to an outer circumference of a wheel for a moving body running on a rail and forming a tread in contact with said rail, wherein said tread-forming component is comprised of a preformed ring made from a ceramic-particle-dispersion reinforced aluminum-base composite material made by dispersing ceramic particles in a matrix of a 6061 aluminum alloy.

* * * * *

UNITED STATES PATENT AND TRADEMARK OFFICE
CERTIFICATE OF CORRECTION

PATENT NO. : 6,352,294 B1 Page 1 of 1
DATED : March 5, 2002
INVENTOR(S) : Morita et al.

It is certified that error appears in the above-identified patent and that said Letters Patent is hereby corrected as shown below:

Title page, Item [54] and Column 1, lines 1-4,
Title, should be changed to read:

-- WHEEL FOR A TRACK-RUNNING MOVING BODY, A MOVING BODY USING SAME WHEELS, A RAIL, AND A RUNNING INSTALLATION USING SAME RAILS --

Signed and Sealed this

Twentieth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,352,294 B1
DATED         : March 5, 2002
INVENTOR(S)   : Morita et al.

It is certified that error appears in the above-identified patent and that said Letters Patent is hereby corrected as shown below:

Column 14,
Lines 5 and 18, delete "v"

Signed and Sealed this

Tenth Day of August, 2004

JON W. DUDAS
*Acting Director of the United States Patent and Trademark Office*